United States Patent
Hoel et al.

(10) Patent No.: US 9,388,051 B2
(45) Date of Patent: Jul. 12, 2016

(54) METHOD FOR PRODUCTION OF TRICHLOROSILANE AND SILICON FOR USE IN THE PRODUCTION OF TRICHLOROSILANE

(75) Inventors: Jan-Otto Hoel, Trondheim (NO); Henning Kjenli, Trondheim (NO); Harry Morten Rong, Heimdal (NO); Torbjorn Roe, Trondheim (NO); Jostein Bjordal, Svelgen (NO)

(73) Assignee: ELKEM AS, Oslo (NO)

( * ) Notice: Subject to any disclaimer, the term of this patent is extended or adjusted under 35 U.S.C. 154(b) by 0 days.

(21) Appl. No.: 13/816,776

(22) PCT Filed: Jul. 6, 2011

(86) PCT No.: PCT/NO2011/000194
§ 371 (c)(1),
(2), (4) Date: Feb. 13, 2013

(87) PCT Pub. No.: WO2012/021064
PCT Pub. Date: Feb. 16, 2012

(65) Prior Publication Data
US 2013/0142722 A1 Jun. 6, 2013

(30) Foreign Application Priority Data
Aug. 13, 2010 (NO) .................................. 20101148

(51) Int. Cl.
*C01B 33/107* (2006.01)
(52) U.S. Cl.
CPC ................ *C01B 33/10763* (2013.01)
(58) Field of Classification Search
CPC ................. C01B 33/10763; C01B 33/10757
USPC ........................................... 423/342
See application file for complete search history.

(56) References Cited

U.S. PATENT DOCUMENTS

| 2002/0044904 A1* | 4/2002 | Bulan et al. ................... 423/342 |
| 2009/0060818 A1* | 3/2009 | Bill, Jr. ............. C01B 33/10763 423/342 |
| 2010/0032630 A1 | 2/2010 | Hariharan |
| 2011/0229398 A1* | 9/2011 | Troll et al. .................... 423/342 |

FOREIGN PATENT DOCUMENTS

| NO | 840513 A | 8/1985 |
| WO | 2005/003030 A1 | 1/2005 |
| WO | 2007/035108 A1 | 3/2007 |
| WO | WO 2010028878 A1 * | 3/2010 |

OTHER PUBLICATIONS

A. Schei, et al. "Impurity Distribution in Silicon" Silicon for the chemical industry III, Sandefjord, Norway, Jun. 18-20, 1992, pp. 11-23; Table1.

* cited by examiner

*Primary Examiner* — Roy King
*Assistant Examiner* — Jenny Wu
(74) *Attorney, Agent, or Firm* — Lucas & Mercanti, LLP

(57) ABSTRACT

The present invention relates to a method for the production of trichlorosilane by reaction of silicon with HCI gas at a temperature between 250° and 1100° C., and an absolute pressure of 0.5-30 atm in a fluidized bed reactor, in a stirred bed reactor or a solid bed reactor, where the silicon supplied to the reactor contains between 40 and 10.000 ppm by weight barium and optionally 40-10000 ppm by weight copper The invention further relates to silicon for use in the production of trichlorosilane by reaction of silicon with HCI gas, containing between 40 and 10.000 ppm by weight barium and optionally 40-10000 ppm by weight copper, the remaining except for normal impurities being silicon.

8 Claims, 4 Drawing Sheets

Figure 1:
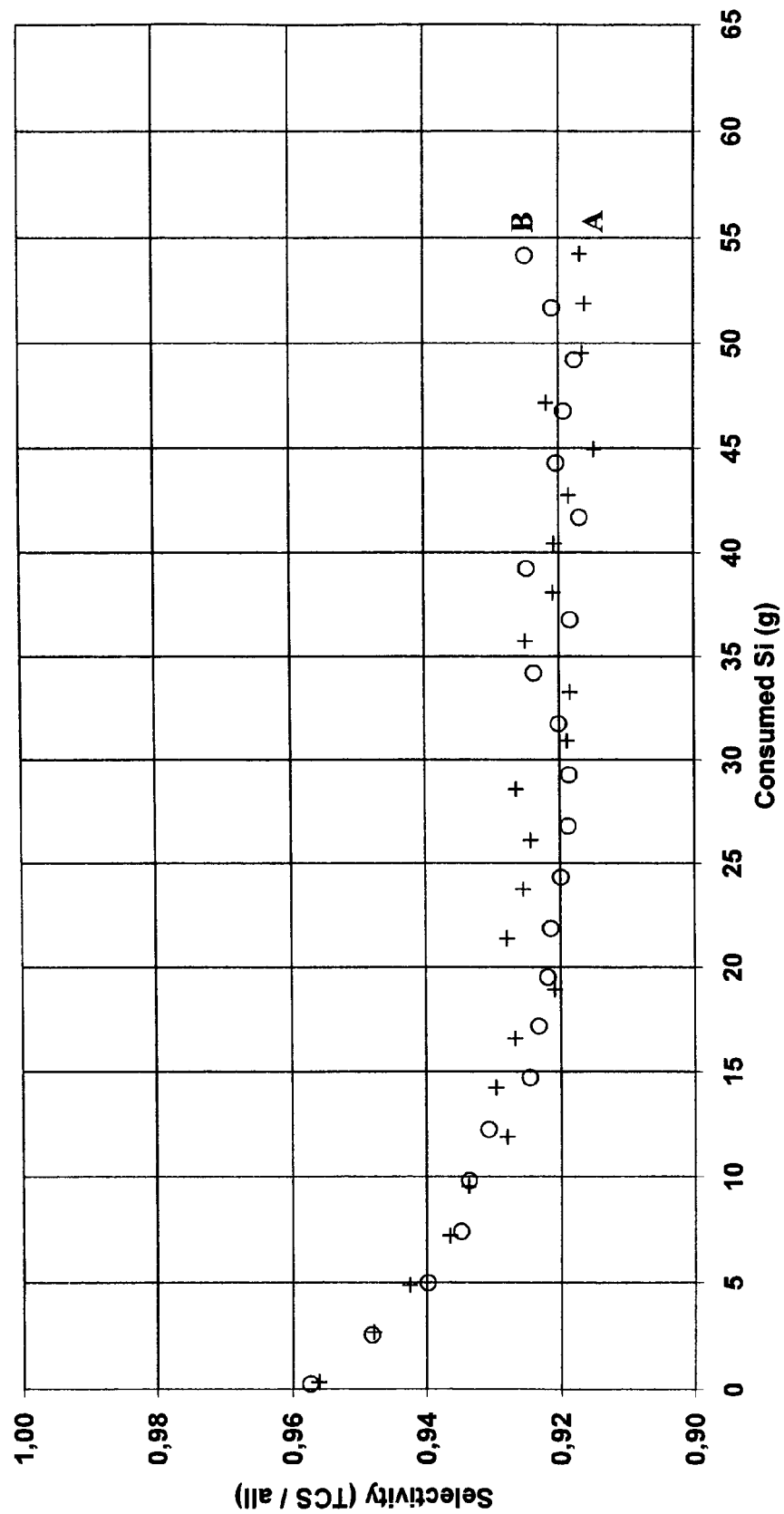

METHOD FOR PRODUCTION OF TRICHLOROSILANE AND SILICON FOR USE IN THE PRODUCTION OF TRICHLOROSILANE

CROSS-REFERENCE TO RELATED APPLICATIONS

This application s a 371 of PCT/NO2011/000194 flied Jul. 6, 2011, which in turn claims the priority of NO 20101148 filed Aug. 13, 2010, the priority of both applications s hereby claimed and both applications are incorporated by reference herein.

FIELD OF INVENTION

The present invention relates to a method for the production of trichlorosilane by reaction of silicon by HCl gas and silicon for the use in production of trichlorosilane.

BACKGROUND ART

In the method of production of trichlorosilane (TCS), metallurgical grade silicon is reacted with HCl gas in a fluidized bed reactor, in a stirred bed reactor or in a solid bed reactor. The process is generally carried out at a temperature between 250° and 1100° C. In the reaction other volatile silanes than TCS are formed, mainly silicon tetrachloride (STC). Since TCS normally is the preferred product, the selectivity of the reaction given as the molar ratio of TCS/(TCS+other silanes) is an important factor. The other important factor is the reactivity of the silicon, measured as first pass HCl conversion. Preferably more than 90% of HCl is converted to silanes, but industrially lower reactivity can be observed.

The selectivity and reactivity will depend strongly on the process temperature when silicon and HCl is reacted. According to the equilibrium calculation the amount of TCS should be about 20-40% (remaining is mainly STC) in the temperature range given above. However, in practical terms a significantly higher TCS selectivity is observed, and at temperatures below 400° C. it is possible to observe TCS selectivity of more than 90%. The reason for this big deviation from equilibrium is that the product composition is given by kinetic limitations. Higher temperature will move the product distribution towards the equilibrium composition and the gap between the observed selectivity and the calculated selectivity will get smaller. Reactivity will increase with higher temperature. Coarser silicon particles (lumps) can therefore be used when the temperature is increased and still maintaining close to 100% HCl consumption.

Higher pressure will move the equilibrium composition towards a slightly higher TCS selectivity. However, in practical terms the main influence of the pressure is higher capacity of the reactor and more heat that have to be withdrawn from the reactor.

Metallurgical grade silicon contains a number of contaminating elements like Fe, Ca, Al, Mn, Ni, Zr, O, C, Zn, Ti, B, P and others. Some contaminants (like for instance Fe and Ca) will react with HCl and will form solid, stable compounds like $FeCl_2$ and $CaCl_2$. The stable metal chlorides will, depending on their size and density, either be blown out of the reactor with the product gases or be accumulated in the reactor. Other contaminants like Al, Zn, Ti, B and P form volatile chlorides, which leave the reactor together with the silanes produced.

O and C are enriched in slag particles of the silicon that do not react or react very slowly with HCl and tend to accumulate in the reactor. The smallest slag particles can be blown out of the reactor and trapped in the filter systems.

Many of the contaminants in metallurgical grade silicon influence the performance of the silicon in the process of producing trichlorosilane by reaction of silicon with HCl gas. Thus both the reactivity of the silicon and the selectivity can be affected both positively and negatively.

DISCLOSURE OF INVENTION

It has now been found that supplying silicon having increased barium content to the reactor for the production of trichlorosilane by reaction with HCl surprisingly provides an increased selectivity and that the selectivity is further increased if copper is added in addition to barium. It has further been found that if the barium content in the trichlorosilane reactor is controlled within certain limits an increase in selectivity is obtained.

According to a first aspect, the present invention relates to a method for the production of trichlorosilane by reaction of silicon with HCl gas at a temperature between 250° and 1100° C. and an absolute pressure of 0.5-30 atm in a fluidized bed reactor, in a stirred bed reactor or in a solid bed reactor, which method is characterised in that the silicon supplied to the reactor contains between 40 and 10 000 ppm by weight of barium and optionally between 40 and 10000 ppm by weight of copper.

Preferably the silicon supplied to the reactor contains between 60 and 1000 ppm by weight of barium.

The barium and optionally the copper is alloyed with the silicon, is mechanically mixed with the silicon or is added to the reactor separately from the silicon.

The barium and optionally the copper can be alloyed to the silicon in the furnace process for producing silicon, in the refining ladle after having tapped the silicon from the furnace or in the casting step. Adding barium and optionally copper to the furnace can be done for instance by addition of barium and optionally copper containing raw materials to the furnace or additions of barium containing compounds like barite ($BaSO_4$), barium silicide, etc and optionally copper containing compounds like copper, copper silicide, copper oxide, etc to the furnace.

Barium or barium compounds and optionally copper and copper compounds can also be added to the silicon in the refining ladle. Any barium compounds and copper compounds added will be reduced by silicon to elemental barium and elemental copper that will form different intermetallic phases when the silicon solidifies.

Barium and optionally copper can also be added to the silicon in the casting step, for instance by adding a barium compound and optionally a copper compound to the molten silicon, by using barium compounds or barium containing silicon in the casting moulds or by casting the silicon on a surface of a material containing barium.

Barium and optionally copper can also be mechanically mixed with silicon.

According to a second aspect, the present invention relates to a silicon for the use in the production of trichlorosilane by reaction of silicon with HCl gas, where the silicon contains between 40 and 10 000 ppm by weight of barium and optionally between 40 and 10 000 ppm by weight of copper, the remaining except for normal impurities being silicon.

Preferably the silicon contains between 60 and 1000 ppm by weight of barium. The silicon according to the present invention is produced by conventional method in carbothermic reduction furnaces. The barium and optionally the copper content in the silicon can either be regulated and controlled by selection of raw materials, adding barium and barium compounds and copper or copper compounds to the furnace or by adding barium and copper to molten silicon in the ladle after the silicon has been tapped from the reduction furnace.

It has surprisingly been found that the addition of barium to silicon improves the selectivity of TCS in the process of producing trichlorosilane. It has further been found that the selectivity of TCS is further strongly increased if copper is added to silicon in addition to barium. Thus there has been found a synergistic effect of addition of both barium and copper.

According to a third aspect the present invention relates to a method for the producing of trichlorosilane by reaction of silicon with HCl gas at a temperature between 250° and 1100° C. and an absolute pressure of 0.5-30 atm in a fluidized bed reactor, in a stirred bed reactor or in a solid bed reactor, which method is characterised in that barium and optionally copper is added to the reactor in an amount necessary to control a barium content in the reactor to between 100 and 50000 ppm by weight and to control the copper content in the reactor to an amount between 200 and 50 000 ppm by weight.

Preferably barium is supplied to the reactor in an amount necessary to control the barium content in the reactor to between 250 and 5 000 ppm by weight.

It has surprisingly been found that by controlling both the barium content and the copper content in the reactor within the above limits a further very substantially increase in the selectivity is obtained.

SHORT DESCRIPTION OF THE DRAWINGS

Figure 2:
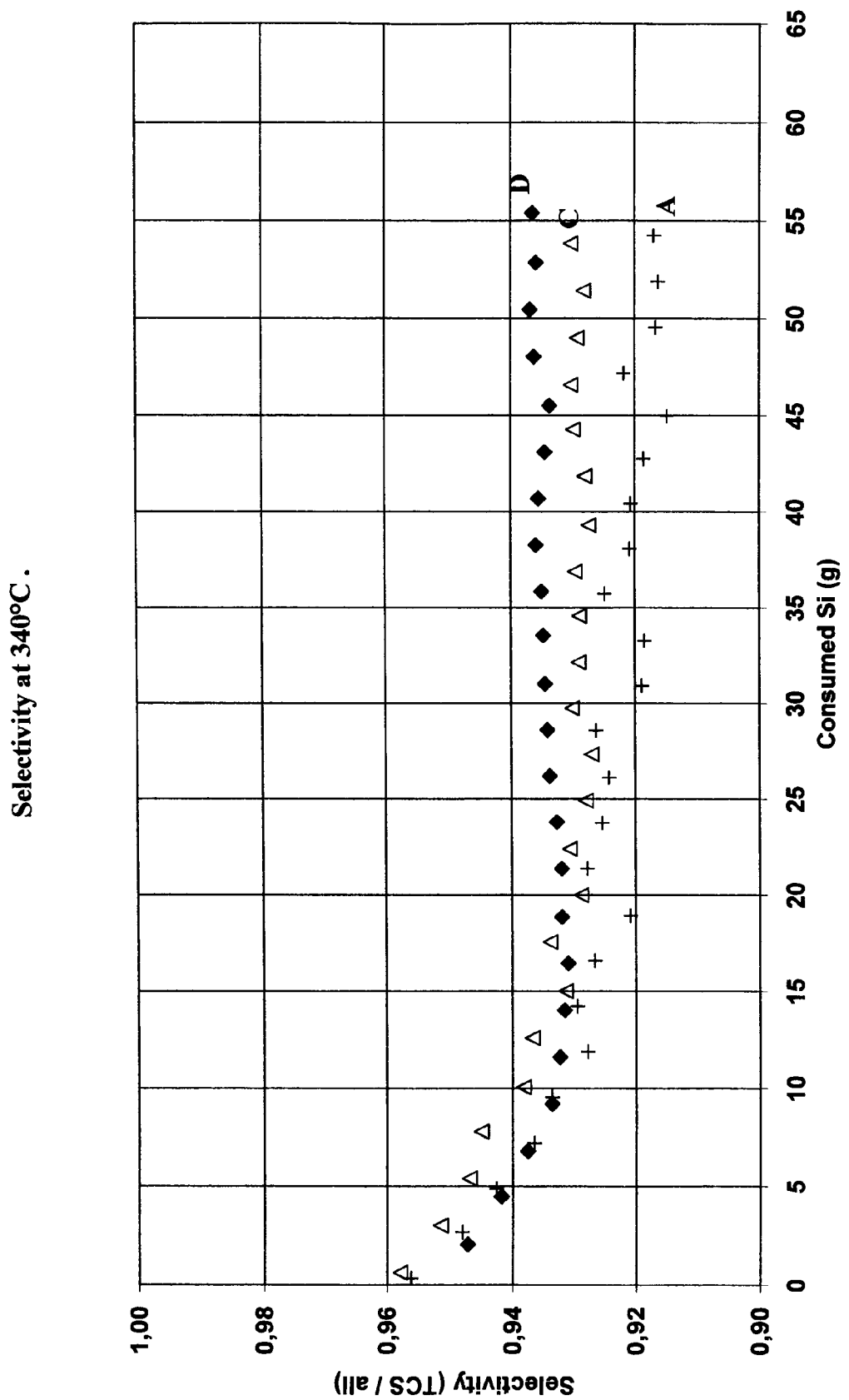
Figure 3:
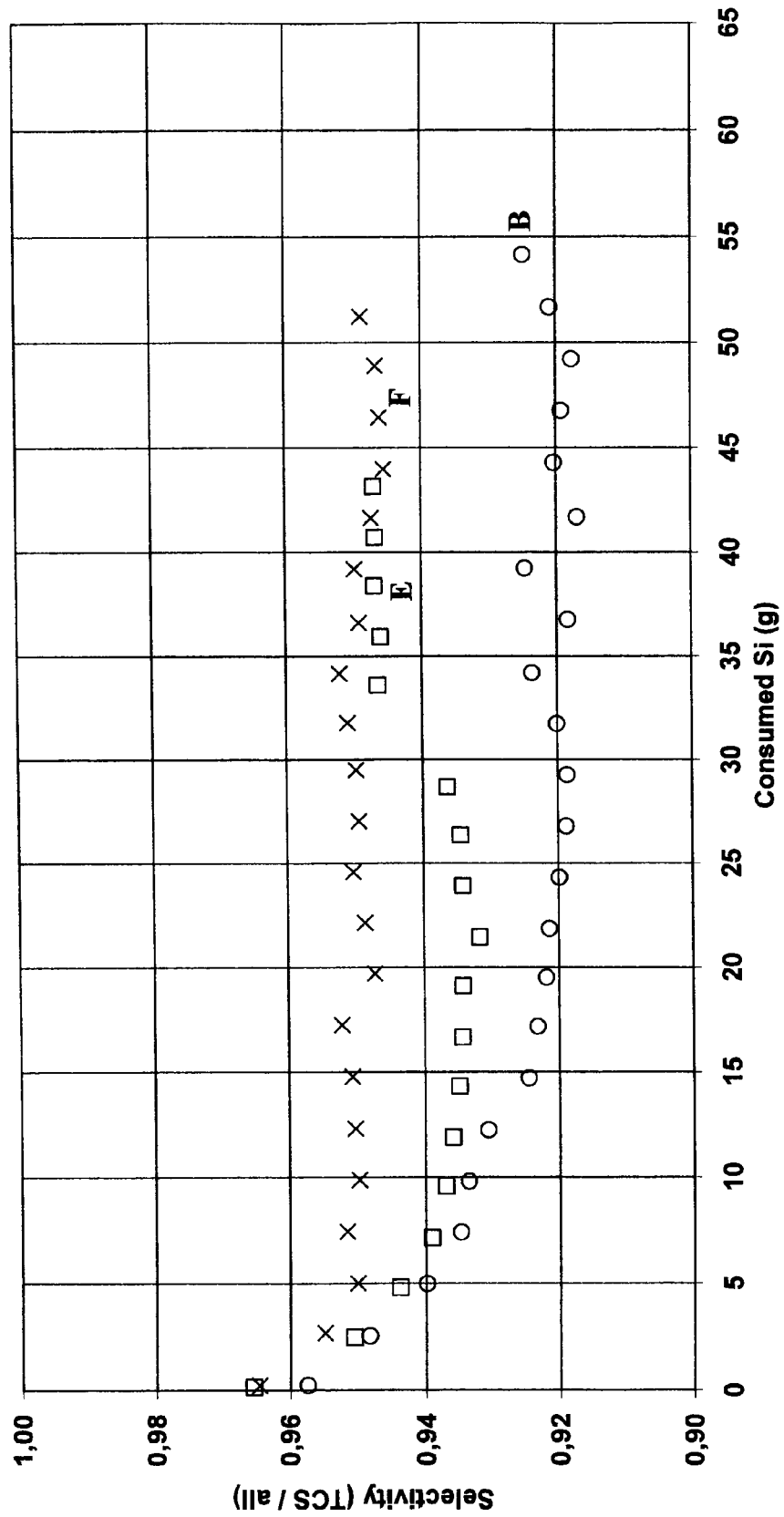
Figure 4:
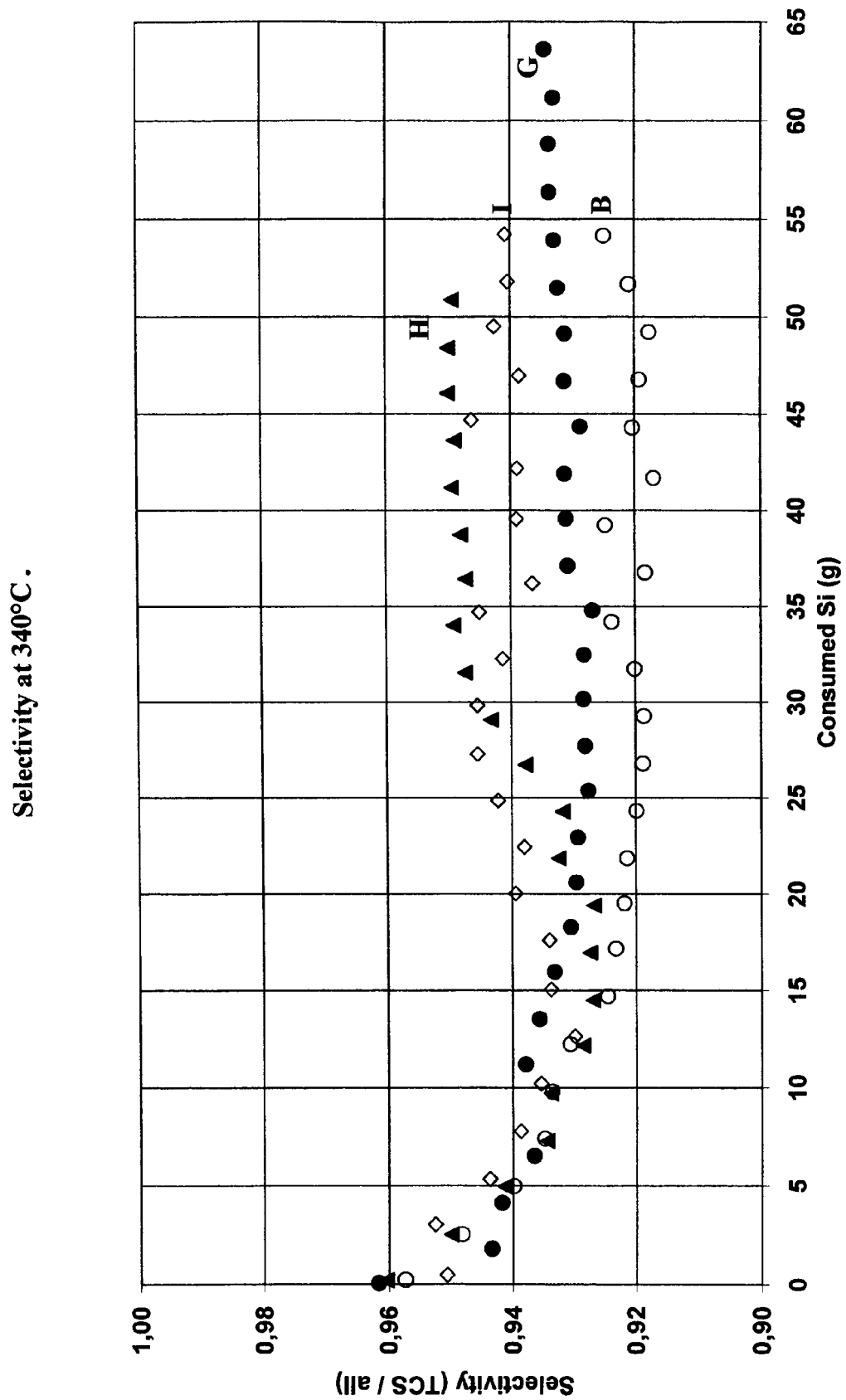

FIG. 1 shows a diagram for selectivity of TCS produced from a commercially available silicon sample A in a continuous fluid bed reactor at 340° C. TCS selectivity for the same silicon sample with addition of copper, sample B,. prior art, FIG. 2 shows a diagram for selectivity of TCS produced from a silicon containing 80 ppm by weight of barium, sample C and a silicon containing 200 ppm by weight of barium, sample D compared to the commercially available silicon sample A, FIG. 3 shows a diagram for selectivity of TCS produced from a silicon containing 72 ppm by weight of barium and 46 ppm by weight of copper, sample E, a silicon initially containing 4032 ppm by weight of barium and 46 ppm by weight of copper, sample F compared to sample B, and FIG. 4 shows a diagram for selectivity of TCS produced from a silicon containing 40 ppm by weight of barium and 46 ppm by weight of copper, sample G, a silicon containing 80 ppm by weight of barium and 46 ppm by weight of copper, sample H and a silicon containing 80 ppm by weight of barium and 200 ppm by weight of copper, sample I, compared to the selectivity obtained with sample B.

DETAILED DESCRIPTION OF THE INVENTION

The following examples were carried out in a laboratory fluidized-bed reactor made from steel and embedded in a heated aluminium block. The reactor is started up with 5 grams of silicon having a particle size of between 180 and 250 pm. A mixture of HCl and argon in amounts of 280 Nml/min and 20 Nml/min respectively was supplied to the bottom of the reactor. The temperature of the reactor is maintained at 340° C. and the pressure at 1.15 bar(a) during the run. As the reaction proceeds new silicon is added continuously from the top of the reactor to maintain a total amount of 5 grams inside the reactor. The composition of the product gas from the reactor was measured with a gas chromatograph (GC). Selectivity was measured as TCS/(TCS+other silanes) and reactivity was measured as HCl conversion; that is the amount of HCl used in the reaction.

Example 1

(Prior art)

Metallurgical grade silicon produced by Elkem A S was crushed, milled and screened to a particle size between 180 and 250 μm, identified as sample A. Metallurgical silicon with similar composition to sample A was prepared . 46 ppm copper was alloyed into the refining ladle. The silicon was then cast, solidified and cooled to room temperature. The sample was then crushed and milled to a particle size between 180 and 250 μm. This sample has been identified as sample B.

The chemical analysis of silicon samples A and B are shown in Table 1.

TABLE 1

|  | Sample A | Sample B | Sample C | Sample D | Sample E | Sample F |
|---|---|---|---|---|---|---|
| Si wt % | 99.49 | 99.49 | 99.49 | 99.49 | 99.49 | 99.49 |
| Al wt % | 0.14 | 0.16 | 0.14 | 0.14 | 0.16 | 0.16 |
| Ca wt % | 0.009 | 0.003 | 0.009 | 0.009 | 0.003 | 0.003 |
| Fe wt % | 0.25 | 0.23 | 0.25 | 0.25 | 0.23 | 0.23 |
| Zr ppmw | <10 | <10 | <10 | <10 | <10 | <10 |
| Sr ppmw | <10 | <10 | <10 | <10 | <10 | <10 |
| Pb ppmw | <10 | <10 | <10 | <10 | <10 | <10 |
| Bi ppmw | <10 | <10 | <10 | <10 | <10 | <10 |
| As ppmw | <10 | <10 | <10 | <10 | <10 | <10 |
| Zn ppmw | <10 | <10 | <10 | <10 | <10 | <10 |
| Cu ppmw | <10 | 46 | <10 | <10 | 46 | 46 |
| Ni ppmw | 47 | 56 | 47 | 47 | 56 | 56 |
| Mn ppmw | 34 | 40 | 34 | 34 | 40 | 40 |
| Cr ppmw | <10 | <10 | <10 | <10 | <10 | <10 |
| V ppmw | 61 | 79 | 61 | 61 | 79 | 79 |
| Ba ppmw | <10 | <10 | 80 | 200 | 72 | 4032 |
| Ti wt % | 0.014 | 0.013 | 0.014 | 0.014 | 0.013 | 0.013 |
| Mo ppmw | <10 | <10 | <10 | <10 | <10 | <10 |
| Sb ppmw | <10 | <10 | <10 | <10 | <10 | <10 |
| Sn ppmw | <10 | <10 | <10 | <10 | <10 | <10 |
| K ppmw | <10 | <10 | <10 | <10 | <10 | <10 |
| P ppmw | 15 | 15 | 15 | 15 | 15 | 15 |

Samples A and B were used to produce trichlorosilane in the laboratory fluidized-bed reactor described above. The selectivity for TCS produced from samples A and B are shown in FIG. 1.

As can be seen from FIG. 1, the addition of 46 ppm by weight of copper to sample A, which did not contain barium, did not change the selectivity. Thus addition of copper alone has no effect on the selectivity. 100% of the HCl was converted in these runs. The results obtained with sample A and B represent prior art.

Example 2

80 ppm by weight of barium in the form of barium silicide powder was mixed to silicon sample A in Table 1. This sample was denoted sample C, shown in Table 1.

200 ppm by weight of barium in the form of barium silicide powder was mixed to silicon sample A in Table 1. This sample was denoted sample D, shown in Table 1.

Samples A, C and D were used to produce trichlorosilane in the laboratory fluidized-bed reactor described above. The selectivity for TCS produced from samples A, C and D are shown in FIG. 2.

As can be seen from FIG. 2, the addition of 80 and 200 ppm by weight of barium as barium silicide to silicon resulted in an increase in selectivity. 100% of the HCl was converted in these runs.

Example 3

72 ppm by weight of barium added as barium oxide powder was mixed to the silicon sample B in Table 1. This sample containing both barium and copper was denoted sample E, shown in Table 1. A further sample F shown in Table 1 was made by adding 0.4 wt % of barium as barium oxide powder to 5 grams of sample B silicon. Silicon sample F was used as start material in the reactor. As silicon was consumed in the reactor, the barium-free silicon sample B was added to maintain 5 g silicon in the reactor. This gives an initial barium content of 0.4 wt % and no further addition of barium during the run. Barium added at the start-up of the experiment will partly remain in the reactor and thus the barium content in the reactor using sample F will essentially be constant during the test run. The chemical analysis of silicon samples B, E and F are shown in Table 1.

Sample B, E and F were used to produce trichlorosilane in the laboratory fluidized-bed reactor described above. The selectivity for TCS produced from sample B, E and F are shown in FIG. 3.

As can be seen from FIG. 3, the addition of 72 ppm by weight of barium as barium oxide and 46 ppm by weight of copper to silicon resulted in a substantial increase in selectivity. The experiment with high initial barium content (identified as sample F in FIG. 3) shows that the selectivity increases faster and stay at a very high level in the entire run. 100% of the HCl was converted in these runs.

Example 4

Metallurgical grade silicon alloyed with 46 ppm by weight of copper and 40 ppm by weight of barium was crushed, milled and screened to a particle size between 180 and 250 µm, identified as sample G in Table 2.

A silicon sample H, shown in Table 2 was made by adding 80 ppm by weight of barium as barium silicide powder with 26 wt % barium to silicon sample B in Table 1. Sample H thus contained 80 ppm by weight of barium and 46 ppm by weight of copper.

A silicon sample I, shown in Table 2 was made by adding 80 ppm by weight of barium as barium silicide powder with 26 wt % barium and 154 ppm by weight of copper as silicon containing 3000 ppm by weight of copper to silicon sample B in Table 1. Sample I thus contained 80 ppm by weight of barium and 200 ppm by weight of copper.

TABLE 2

|  | Sample G | Sample H | Sample I |
|---|---|---|---|
| Si wt % | 99.35 | 99.49 | 99.49 |
| Al wt % | 0.14 | 0.16 | 0.16 |
| Ca wt % | 0.029 | 0.003 | 0.003 |
| Fe wt % | 0.36 | 0.23 | 0.23 |
| Zr ppmw | 11 | <10 | <10 |
| Sr ppmw | <10 | <10 | <10 |
| Pb ppmw | <10 | <10 | <10 |
| Bi ppmw | <10 | <10 | <10 |
| As ppmw | <10 | <10 | <10 |
| Zn ppmw | <10 | <10 | <10 |
| Cu ppmw | 46 | 46 | 200 |
| Ni ppmw | 23 | 56 | 56 |
| Mn ppmw | 57 | 40 | 40 |
| Cr ppmw | 11 | <10 | <10 |
| V ppmw | 47 | 79 | 79 |
| Ba ppmw | 40 | 80 | 80 |
| Ti wt % | 0.021 | 0.013 | 0.013 |
| Mo ppmw | <10 | <10 | <10 |
| Sb ppmw | <10 | <10 | <10 |
| Sn ppmw | <10 | <10 | <10 |
| K ppmw | <10 | <10 | <10 |
| P ppmw | 15 | 15 | 15 |

Sample B, G, H and I were used to produce trichlorosilane in a laboratory fluidized-bed reactor described above. The selectivity for TCS produced from sample B, G, H and I are shown in FIG. 4.

As can be seen from FIG. 4, the addition of 40 ppm by weight of barium alloyed into silicon and 46 ppm by weight of copper to silicon resulted in an increase in TCS selectivity while the addition of 80 ppm by weight of barium as barium silicide and 46 ppm by weight and 200 ppm by weight of copper to silicon resulted in a very strong increase in TCS selectivity.

100% of the HCl was converted in these runs.

The results shows that barium added to silicon gives a clear increase in TCS selectivity, while addition of both barium and copper results in a very strong increase in TCS selectivity even with a relatively low addition of barium. As is shown in example 1 sample B, addition of copper without addition of barium does not give an increase in TCS selectivity.

The invention claimed is:

1. A method for increasing trichlorosilane (TCS) selectivity in direct chlorination comprising:
    reacting silicon with HCl gas at a temperature between 250 and 1100° C., and an absolute pressure of 0.5-30 atm in a fluidized bed reactor, in a stirred bed reactor or in a solid bed reactor; and
    supplying barium or barium compounds and copper or copper compounds to the reactor in an amount necessary to maintain a barium content in the reactor of between 100 and 50,000 ppm based on the weight of silicon in the reactor and to maintain a copper content in the reactor of between 200 and 50,000 ppm by weight, thereby increasing selectivity of trichlorosilane in direct chlorination.

2. The method according to claim 1, wherein the barium or the barium compounds is supplied to the reactor in an amount necessary to maintain the barium content in the reactor to between 200 and 5000 ppm by weight.

3. The method according to claim 1, wherein the barium and the copper supplied to the reactor are alloyed with the silicon.

4. The method according to claim 1, comprising mechanically mixing the barium or the barium compounds and the copper or the copper compounds supplied to the reactor with the silicon before the mixture is supplied to the reactor.

5. The method according to claim 4, wherein the barium compound is selected from the group consisting of barium silicide, barium chloride, barium oxide, barium carbonate, barium nitrate and barium sulfate.

6. The method according to claim 4, wherein the copper compound is selected from the group consisting of copper, copper alloys, copper silicide, copper oxides, copper chlorides, copper carbonate, copper nitrate and copper hydroxide.

7. The method according to claim 1, comprising adding the barium and the silicon separately to the reactor. barium or barium compounds is supplied to the reactor in an amount necessary to maintain the barium content in the reactor to between 200 and 5000 ppm by weight.

8. The method according to claim 7, comprising adding the barium compounds to the reactor with the HCl gas.

* * * * *